United States Patent [19]

Greune

[11] Patent Number: 4,880,244
[45] Date of Patent: Nov. 14, 1989

[54] MOUNTING FOR A SEALING RING

[75] Inventor: Christian Greune, Fuerstenfeldbruck, Fed. Rep. of Germany

[73] Assignee: MTU Motoren-und Turbinen-Union Muenchen GmbH, Munich, Fed. Rep. of Germany

[21] Appl. No.: 300,731

[22] Filed: Jan. 19, 1989

Related U.S. Application Data

[63] Continuation of Ser. No. 107,246, Oct. 9, 1987, abandoned.

[30] Foreign Application Priority Data

Oct. 24, 1986 [DE] Fed. Rep. of Germany ....... 3636165

[51] Int. Cl.$^4$ .......................... F16J 15/44; F16J 15/54
[52] U.S. Cl. ..................................... 277/174; 277/173; 277/176; 277/198; 277/199
[58] Field of Search .............. 277/136, 137, 216, 176, 277/44, 151, 192, 166, 183, 184, 173–176, 198, 199; 220/436, 437; 384/906

[56] References Cited

U.S. PATENT DOCUMENTS

| | | | |
|---|---|---|---|
| 1,359,596 | 11/1920 | Hill .................................. | 277/149 X |
| 2,203,154 | 6/1940 | Johnston ......................... | 277/151 X |
| 2,283,056 | 5/1942 | Guardiola ....................... | 277/149 X |
| 3,001,806 | 9/1961 | Macks ............................. | 277/174 X |
| 3,062,151 | 11/1962 | Eickmann . | |
| 3,333,855 | 8/1967 | Andresen ....................... | 277/175 X |
| 3,439,924 | 4/1969 | Ludewis et al. ................. | 277/137 |
| 3,988,026 | 10/1976 | Kemp, Jr. ........................ | 277/65 X |
| 4,175,755 | 11/1979 | Geary ............................... | 277/137 |
| 4,177,997 | 12/1979 | Cartwright ..................... | 277/173 X |
| 4,330,133 | 5/1982 | Palfveyman et al. ........... | 277/174 X |
| 4,453,721 | 6/1984 | Anghs et al. .................... | 277/198 X |
| 4,575,102 | 3/1986 | Roj et al. ......................... | 277/80 X |

FOREIGN PATENT DOCUMENTS 475678 11/1937 United Kingdom ................ 277/174

Primary Examiner—Allan N. Shoap
Attorney, Agent, or Firm—W. G. Fasse; D. H. Kane, Jr.

[57] ABSTRACT

A sealing ring device includes a sealing ring and a mounting or carrier ring which are supported relative to each other and relative to a housing or further hollow shaft. Thus, two pressure members are inserted between the sealing ring and the carrier ring at locations which are displaced by about 180° from each other. Further, two additional pressure members are inserted between the carrier ring and the housing, whereby these additional pressure members are again displaced relative to each other at diametrically opposite locations. Thus, the angular spacing between neighboring pressure members is about 90°. This construction makes sure that any bearing play or clearance remains small and independent of any centering errors in the shaft relative to its bearing in a housing or in another hollow shaft.

10 Claims, 2 Drawing Sheets

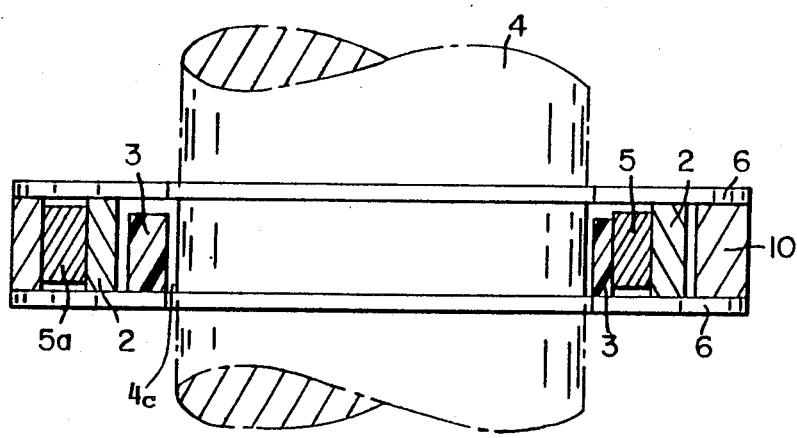
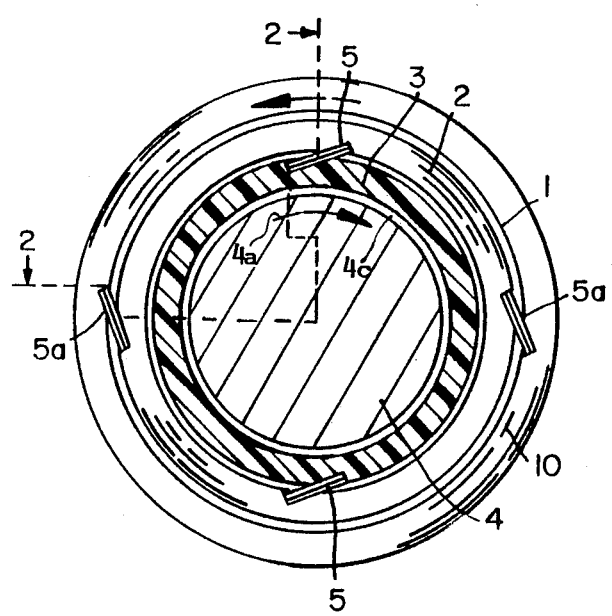

MOUNTING FOR A SEALING RING

This application is a continuation of application Ser. No. 107,246 filed Oct. 9, 1987, now abandoned.

FIELD OF THE INVENTION

The invention relates to a mounting for a sealing ring which is located between a rotating shaft and the inner wall of a concentric bore in which the shaft is rotatable, whereby a small radial play or clearance is provided between the shaft and the sealing ring.

DESCRIPTION OF THE PRIOR ART

Seals are generally constructed to have as little play or clearance as possible in order to minimize any leakage flow. Sealing rings located in chambers are known, for example, in the form of radial slide ring seals which are arranged with tight play or clearance on the shaft. Such sealing rings are anchored to a fixed point to prevent the sealing ring from turning out of its sealing position. This type of construction has the disadvantage that the sealing ring, due to its one-sided anchoring, also assumes a one-sided run-in configuration, whereby the sealing ring becomes non-symmetric and loses some of its sealing effect. Due to reaction forces including centrifugal forces when the ring is arranged between two rotating shafts, the ring would rapidly be worn out.

In connection with seals used in turbo engines there is the further problem that extremely small mounting clearances are increased during the operation of the seal. Such increase in the clearance is caused by contacts among the sealing elements, for example, between the sealing ring and the shaft, or they are due to the influence of heat expansion, off-center movements of the shafts, eccentricities in the components and so forth. In actual operation, all these influences define the actual clearance between the seal and the shaft in operation.

It is known to compensate for clearance increases caused by temperature influences, by employing suitable materials and by a thermal treatment of the shaft and the sealing ring. However, such measures are not effective when it is necessary to compensate the effects of an off-center displacement of the shaft, a planing or floating type of motion of the rotor in the bearing clearance or play, and similar dynamic effects.

OBJECTS OF THE INVENTION

In view of the foregoing it is the aim of the invention to achieve the following objects singly or in combination:

to construct and mount a sealing ring in such a way that the sealing ring is secured against entrainment so that any centering faults are compensated by an automatic self-adjustment of the sealing ring;

to avoid the above mentioned one-sided run-in of the sealing ring on its shaft to thereby also prevent the reduction in the sealing effect; and to reduce the forces to which the sealing ring is exposed during operation as much as possible.

SUMMARY OF THE INVENTION

A sealing ring according to the invention is anchored radially outwardly and radially inwardly. Thus, a carrier ring is movably connected to the endless sealing ring at two locations located diametrically opposite each other. The carrier ring for the sealing ring is also movably secured in a bore of a housing or inside a second concentric hollow shaft at two further locations displaced by 90° relative to the first mentioned two locations between the sealing ring and the carrier ring. In such a mounting the carrier ring is located between the sealing ring and the inner wall of said bore. Such a mounting has the advantage that outer reaction forces are prevented from being effective on the sealing ring, whereby a one-sided run-in of the sealing ring is prevented.

By arranging the carrier ring between the sealing ring and the housing, the sealing ring is permitted to move free of external forces and within the maximum off-center displacement of the shaft within the bore.

It is advantageous to make the outer diameter of the sealing ring smaller than the inner diameter of the carrier ring and to further make the outer diameter of the carrier ring smaller than the diameter of the bore in the housing. In this manner the sealing ring is enabled to move with any off-center displacement of the shaft without any forces being applied to the sealing ring so that the deformations which would increase the wear and tear do not occur.

Preferably, and advantageously, the sealing ring has an axial length which is smaller than the axial length of the carrier ring. A ring-shaped cover plate is arranged on each side of the carrier ring. Since the sealing ring is shorter than the carrier ring, it is possible for the sealing ring to be axially displaced within the limits defined by the cover plates which are sufficient to permit the sealing ring to follow any axial shaft displacements. Due to an axially effective pressure gradient across the sealing ring, the latter is pressed against one of the ring shaped cover plates for achieving the sealing effect.

In one embodiment mounting members connect the sealing ring whereby these mounting members are so slanted relative to the respective rotational direction that the mounting members are subject primarily to pressure loads to the carrier ring. The mounting members take up the friction moment occurring between the sealing ring and the shaft. These mounting members achieve a simple elastic coupling between the carrier ring and the sealing ring. Further, the carrier ring may be anchored to the housing by similar mounting members in the bore which are also subject primarily to pressure loads. These mounting members are advantageously dimensioned to provide some clearance or play in order to assure an anchoring which remains substantially free of bending stress even when the shaft should be subject to an off-center displacement.

Preferably, two mounting members are arranged between the sealing ring and the carrier ring and two more mounting members are arranged between the carrier ring and the inner wall of the bore in the housing.

Where it is necessary that the shaft can rotate in one or the other direction, a further embodiment of the invention provides a coupling through tongue and groove connections which are taking up torque moments in both directions.

BRIEF DESCRIPTION OF THE DRAWINGS

In order that the invention may be clearly understood, it will now be described, by way of example, with reference to the accompanying drawings, wherein:

FIG. 1 is a sectional view through a sealing ring mounting according to the invention with the sectional plane extending perpendicularly to the longitudinal axis of a shaft;

FIG. 2 shows the embodiment of FIG. 1 in an axial section, whereby the sectional plane extends in the direction of the longitudinal axis of the shaft and as viewed in the direction of arrows 2—2;

Figure 3:
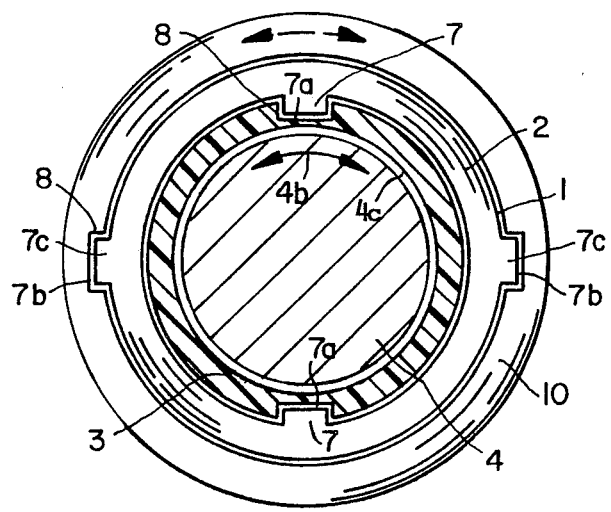
FIG. 3 shows a sectional view through another embodiment of a sealing ring mounting according to the invention in which the pressure mounting members are constructed as tongue and groove couplings.

DETAILED DESCRIPTION OF PREFERRED EXAMPLE EMBODIMENTS AND OF THE BEST MODE OF THE INVENTION

Referring to FIGS. 1 and 2, the present sealing ring device comprises an endless sealing ring 3 secured on a shaft 4 with a small clearance. The clearance is small but it is shown exaggerated in the drawings at 4C. The device further comprises a carrier ring 2 which is secured to the endless sealing ring 3 by two rigid mounting members 5 located diametrically opposite each other and slanted relative to the respective rotational direction. This anchoring of the carrier ring 2 to the endless sealing ring 3 and vice versa is so arranged that there is a clearance between the sealing ring and the carrier ring sufficient to permit a relative motion between these two rings 2 and 3 in a radial direction. Similarly, the carrier ring 2 is mounted in a bore 1 of a housing 10 by means of two rigid mounting members 5a also located diametrically opposite each other so that there is a 90° angular spacing from mounting member 5 to mounting member 5a and so forth. The mounting members 5, 5a are constructed as pins which are capable of taking up the frictional forces occurring between the shaft 4 and the sealing ring 3 in the rotational direction indicated by the arrow 4a. Due to the slanting relative to a tangent at the respective locations of the mounting members 5, 5a as shown in FIG. 1, these members are exposed primarily to compression loads.

FIG. 2 is a sectional view along section line 2—2 in FIG. 1. As shown, the sealing ring mounting includes two cover plates 6 secured to the housing 10. The axial spacing between the two cover plates is larger than the axial length of the sealing ring 3, whereby the cover plates 6 limit the axial displacement of the endless sealing ring 3. The carrier ring 2 on the other hand, has an axial length corresponding to the axial spacing between the cover plates 6 so that the carrier ring 2 cannot be axially displaced between the two cover plates 6. The hole in the ring-shaped cover plate 6 is such that the pressures prevailing on opposite sides of the sealing device are effective on the sealing ring 3. Assuming, the pressure above the sealing device is larger than the pressure below the sealing device, then the sealing ring 3 is pressed against the inner surface of the lower sealing ring cover plate 6.

FIG. 3 shows an embodiment in which the endless sealing ring mounting device is suitable for use in connection with a shaft 4' that is rotatable in one or the other direction as indicated by the double arrow 4b. In this embodiment grooves 7a are provided in the sealing ring 3 at diametrically opposite locations. Rigid tongues 7 reaching radially inwardly of the carrier ring 2 extend into these grooves 7a. Similarly, the housing 10 which may be embodied by a hollow shaft is provided with radially inwardly facing grooves 7b into which rigid tongues 7c of the carrier ring 2 reach. The arrangement could also be vice versa so that the grooves are in the carrier ring 2 and the tongues are in the sealing ring 3 and in the housing or hollow shaft 10.

Figure 4:
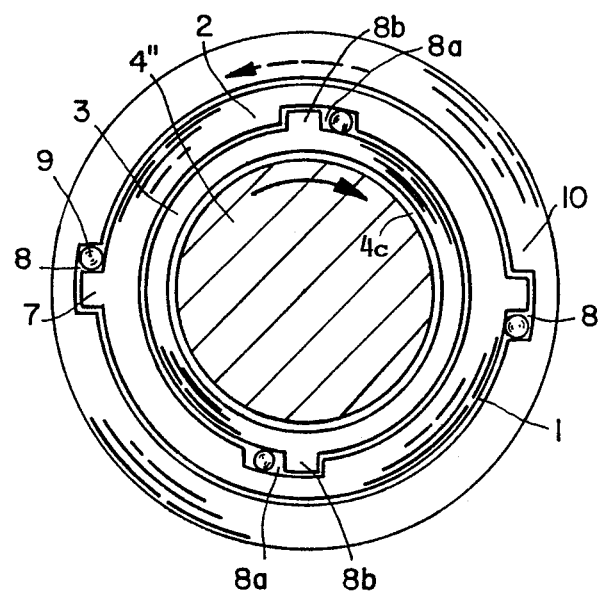
FIG. 4 is a sectional view similar to that of FIG. 3, wherein again the pressure members are constructed as tongue and groove couplings combined with rolling contact elements.

FIG. 4 shows an embodiment in which the grooves 8 in the housing or hollow shaft 10 and the grooves 8a in the sealing ring, receive rigid tongues 7 of the carrier ring and rigid tongues 8b of the sealing ring respectively. However, in this embodiment the grooves 8 and 8a have such a circumferential length that rolling contact bodies 9, such as rollers or needle rollers are additionally received in these grooves. These rolling contact point bodies 9 facilitate the rotation of the shaft in one direction and the rotation of the housing 10 in the opposite direction. Since the housing 10 has a bore 1 it can form a hollow shaft.

Although the invention has been described with reference to specific example embodiments, it will be appreciated, that it is intended to cover all modifications and equivalents within the scope of the appended claims.

What I claim is:

1. A sealing device for sealing a gap between a rotating shaft and an inner wall of a bore in a shaft support member (10) through which the shaft passes, comprising an endless sealing ring (3), a carrier ring (2) for supporting said endless sealing ring (3) in said bore, first rigid movement permitting means operatively inserted between said endless sealing ring and said carrier ring at two approximately diametrically opposite first locations for movably securing said endless sealing ring (3) to said carrier ring (2) at said two first locations, and second rigid movement permitting means operatively inserted between said carrier ring (2) and said shaft support member (10) also at two approximately diametrically opposite second locations for movably securing said carrier ring in said shaft support member (10) at said two second locations, said first and second rigid movement permitting means being angularly spaced from each other by about 90°, said carrier ring supporting said endless sealing ring exclusively through said first rigid movement permitting means.

2. The sealing device of claim 1, wherein said support member is a housing in which said shaft is rotatably mounted.

3. The sealing device of claim 1, wherein said bore has a given first inner diameter, said carrier ring having an outer diameter smaller than said given first inner diameter, said carrier ring having a given second inner diameter, said sealing ring having an outer diameter smaller than said given second inner diameter.

4. The sealing device of claim 1, wherein said carrier ring has a given axial width, said sealing ring having an axial width smaller than said given axial width of said carrier ring.

5. The sealing device of claim 1, wherein said first and second rigid movement permitting rigid means comprise tongue means and groove means between said sealing ring and said carrier ring and between said carrier ring and said support member.

6. The sealing device of claim 5, wherein said groove means have a dimension in a circumferential direction which is larger than a respective dimension of said tongue means to provide extra space in said groove means, said device further comprising rolling contact bodies in said extra space.

7. The sealing device of claim 6, wherein said rolling contact bodies are rollers located in said extra space.

8. The sealing device of claim 1, wherein said support member rotates in the direction opposite to the direction in which the shaft rotates.

9. A sealing device for a sealing gap between a shaft (4) rotating in a given rotation direction and an inner wall of a bore in a shaft support member through which the shaft passes, comprising an endless sealing ring (3), a carrier ring (2) for supporting said endless sealing ring in said bore, at least two first slanted movement permitting mounting pins, each first pin (5) engaging with one pin end a slanted groove in said sealing ring (3) and with an opposite pin end a correspondingly slanted groove in said carrier ring (2) at two approximately diametrically opposite first locations, said two first mounting pins (5) extending at such a slant relative to a tangent of said sealing ring (3) at said first locations that said first pins point opposite said rotation direction, at least two second slanted movement permitting mounting pins, each second pin (5a) engaging with one pin end a slanted groove in said carrier ring (2) and with an opposite pin end a correspondingly slanted groove in said shaft support member (10) at two approximately diametrically opposite second locations, said two second mounting pins (5a) also extending at said slant relative to a tangent of said mounting ring (2) at said second locations so that said second pins also point opposite said rotation direction, said first and second mounting pins being angularly spaced from each other by about 90°.

10. The sealing device of claim 9, wherein said slanted grooves in said sealing ring, in said carrier ring, and in said support member are so dimensioned, that said mounting pins are inserted into said grooves with a clearance between said rings and said mounting pins.

* * * * *